United States Patent [19]

Wu et al.

[11] Patent Number: 5,468,508
[45] Date of Patent: Nov. 21, 1995

[54] PRESERVATION OF FRESH FRUIT JUICES AND FRUIT JUICE BLENDS

[75] Inventors: Chiu H. Wu, Vancouver; William D. Powrie, North Vancouver, both of Canada

[73] Assignee: The University of British Columbia, Vancouver, Canada

[21] Appl. No.: 16,566

[22] Filed: Feb. 11, 1993

Related U.S. Application Data

[63] Continuation-in-part of Ser. No. 779,368, Oct. 17, 1992, abandoned.

[51] Int. Cl.$^6$ ............................ A23L 2/06; A23L 3/3418; B65B 31/00
[52] U.S. Cl. ........................ 426/316; 426/392; 426/397; 426/410; 426/474; 426/599
[58] Field of Search ................................. 426/330, 330.3, 426/330.5, 321, 312, 316, 599, 392, 474, 475, 477

[56] References Cited

U.S. PATENT DOCUMENTS

| | | | |
|---|---|---|---|
| 1,066,153 | 7/1913 | Rueff | 426/477 |
| 1,208,859 | 12/1916 | Takamine et al. | |
| 1,336,720 | 4/1920 | Baulig | |
| 1,527,304 | 2/1925 | Heyman | 426/477 |
| 1,980,695 | 11/1934 | Polk | 426/487 |
| 2,035,619 | 3/1936 | Robison | |
| 2,054,066 | 9/1936 | Ayers et al. | 426/474 |
| 2,227,101 | 12/1940 | Meyer | 426/477 |
| 2,299,553 | 10/1942 | McKinnis | 426/475 |
| 2,318,178 | 5/1943 | McKinnis | 426/475 |
| 2,319,994 | 5/1943 | Ketchum | 426/475 |
| 2,325,360 | 7/1943 | Ayers et al. | 426/399 |
| 2,357,895 | 9/1944 | Higby | 426/399 |
| 2,428,044 | 9/1947 | Sharp et al. | 426/487 |
| 2,517,569 | 8/1950 | Huzenlaub | 426/399 |
| 2,793,125 | 5/1957 | Keller | |
| 3,044,887 | 7/1962 | Smith et al. | 426/475 |
| 3,087,822 | 4/1963 | Smith et al. | 426/475 |
| 3,102,036 | 8/1963 | Smith | 426/475 |
| 3,111,412 | 11/1963 | Mouk | |
| 3,113,871 | 12/1963 | Webster | 426/475 |
| 3,391,009 | 7/1968 | Fehlberg et al. | 426/487 |
| 3,900,571 | 8/1975 | Johnson | |
| 4,001,443 | 1/1977 | Dave | |
| 4,006,257 | 2/1977 | Kolk | |
| 4,055,931 | 11/1977 | Myers | |
| 4,079,152 | 3/1978 | Bedrosian et al. | |
| 4,235,750 | 11/1980 | Cazalet | |
| 4,238,511 | 12/1980 | Egretier | |
| 4,331,693 | 5/1982 | Wojciechowski et al. | |
| 4,337,276 | 6/1982 | Nakamura et al. | |
| 4,411,921 | 10/1983 | Woodruff | |
| 4,423,080 | 12/1983 | Bedrosian et al. | |
| 4,515,266 | 5/1985 | Myers | |
| 4,643,902 | 2/1987 | Lawhon et al. | |
| 4,766,001 | 8/1988 | Mizandjian et al. | |
| 4,835,937 | 6/1989 | Meyer et al. | |
| 4,895,729 | 1/1990 | Powrie et al. | |
| 5,006,354 | 4/1991 | Rahrooh et al. | 426/487 |

FOREIGN PATENT DOCUMENTS

| | | |
|---|---|---|
| 2922145 | 3/1980 | Germany. |
| 3136622 | 9/1982 | Germany. |
| 2-268670 | 11/1990 | Japan. |
| 416632 | 9/1934 | United Kingdom. |

OTHER PUBLICATIONS

Complete Course in Canning pp. 505 Plus Canning Trade 1975.
Fellers, P. J., "Shelf Life and Quality of Freshly Squeezed, Unpasteurized, Polyethylene–Bottled Citrus Juice", *J. Food Sci.* 53(6):1699, 1988.
Kopelman, J. and Rauchwerger, M., "Shelf–Life and Microbial Growth Kinetics of Fresh Citrus Juices: Shamouti Orange", *J. Food Proc. Preserv.*, 8:241, 1985.
Li, Z. Alli, I. and Kermasha, S., "Use of Acidification, Low Temperature, and Sorbates for Storage of Orange Juice", *J. Food Sci.*, 54(3):674, 1989.
Jen, J. J., "Qualty Factors of Fruits and Vegetables", 1989, American Chemical Society, Washington, D.C.
Schreier, P., "Changes of Flavour Compounds during the Processing of Fruit Juices", in Goodenough, P. W., and Atkin, R. K. (eds.), *Quality in Stored and Processed Vegetables and Fruit*, Academic Press, New York, 1981, 355–371.
LaBell, F., "Controlled & Modified Atmosphere Packaging", *Food Processing*, Jan. 1985, pp. 152–154.
Saguy, I. and Mannheim, C. H., "Prolonging Shelf–Life of Strawberries by Packaging in Selected Plastic Films", *Cooling and Ripening of Fruits in Relation to Quality*, *Refrigeration Science and Technology*, Int. Inst. Refrig., 1973, pp. 149–158.
Marcellin, P., "Conservation des Fruits et Legumes en Atmosphere Controlee, a l'Aide de Membranes de Polymeres", *Rev. Gen. Froid*, 64:217, Mar. 1974.
Wang, C. Y., "Physiological and Biochemical Effects of Controlled Atmosphere on Fruits and Vegetables", in Calderon, M. and Barkai–Bolin (eds.), *Food Preservation by Modified Atmosphere*, CRC Press, Boca Raton, Fla., 1990, pp. 197–207.
Day, N. B., Skura, B. J. and Powrie, W. D., "Modified Atmosphere Packaging of Blueberries: Microbiological Changes", *Can. Inst. Food Sci. Technol. J.* 23(1): 59–65, 1990.
El–Goorani, M. A. and Sommer, N. F., "Effects of Modified Atmospheres on Postharvest Pathogens of fruits and Vegetables", *Horticultural Reviews*, 3:412, 1981.

*Primary Examiner*—Steven Weinstein
*Attorney, Agent, or Firm*—Griffin, Butler, Whisenhunt & Kurtossy

[57] ABSTRACT

This invention pertains to a novel process for preserving the quality attributes and ascorbic acid content of fresh fruit juices and fruit juice blends. The process involves sanitizing the outer surface of a fruit, extracting the juice from the edible portion of the fruit, gasifying the juice with an oxygen-containing, carbon dioxide-containing gas mixture, filling a high gas-barrier container with the juice; hermetically sealing the container and rapidly cooling the juice in the container. Alternatively, the extracted juice may be filled into the high gas barrier container and then gasified prior to hermetically sealing the container.

17 Claims, 1 Drawing Sheet

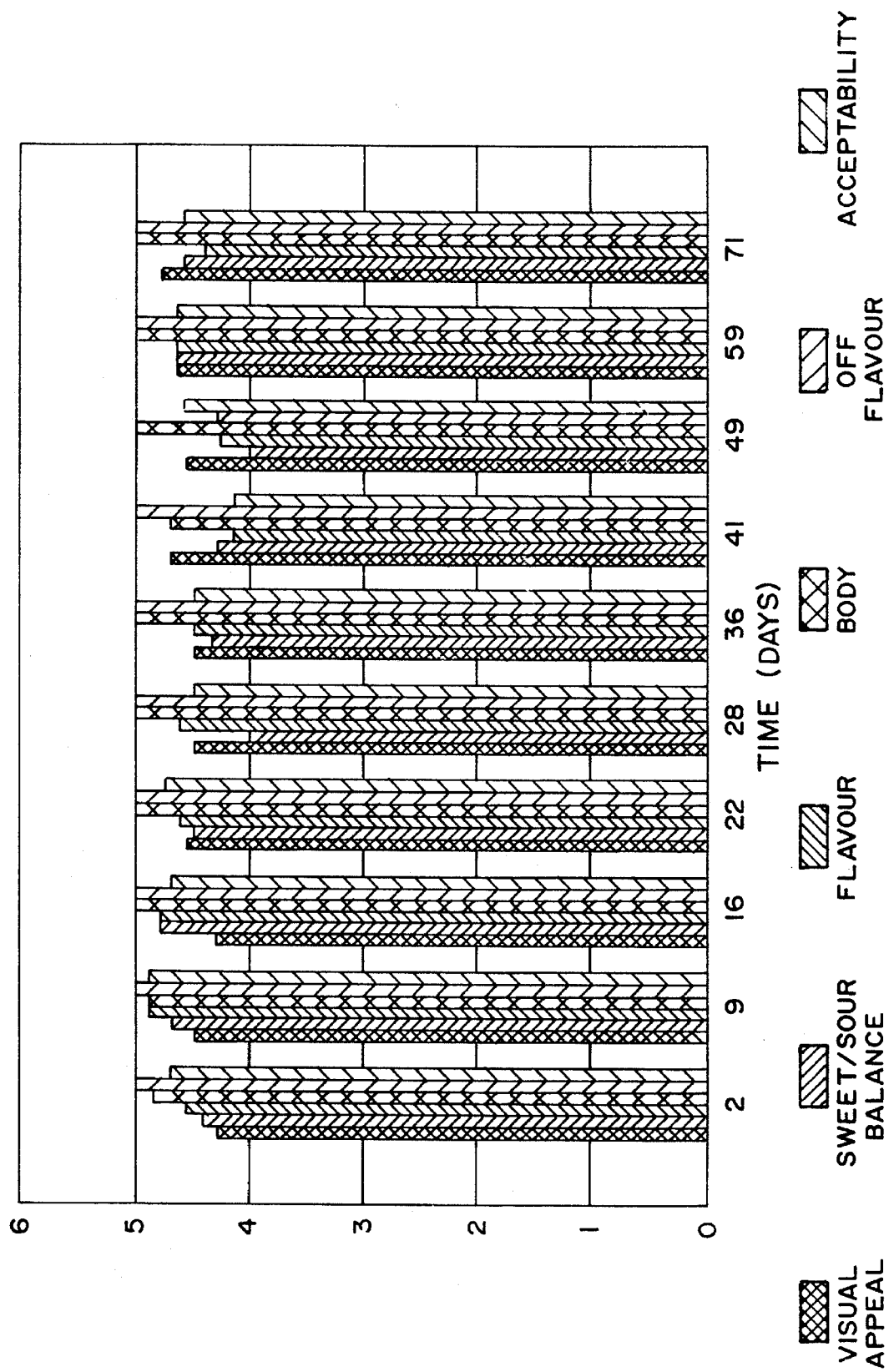

PRESERVATION OF FRESH FRUIT JUICES AND FRUIT JUICE BLENDS

This application is a continuation-in-part of application Ser. No. 07/779,368, filed Oct. 17, 1992, now abandoned.

FIELD OF THE INVENTION

This invention pertains to a novel method of preserving fruit juices and fruit juice blends. More particularly, this invention is directed to a method for preserving the fresh flavour, colour, body and ascorbic acid content of citrus juices, tropical fruit juices, citrus-tropical fruit blends and other fruit juices and fruit juice blends, held in storage for periods up to about twelve weeks at refrigerated temperatures of about −1° C. to 8° C.

BACKGROUND OF THE INVENTION

The shelf life of fresh citrus juices (orange and grapefruit) packaged in polyethylene bottles is dependent primarily on storage temperature (Fellers, J. Food Sci. 53, 1699, 1988): 1.1° C., 16–22 days; 4.4° C., 10–16 days; and 7.8° C. 5–8 days. Kopelman and Rauchwerger (J. Food Proc. Preserv. 8; 241, 1985) reported the following shelf life values for Shamouki orange juice: 2.0° C., 16 days; 2.7° C., 14 days; 5.7° C., 10 days; 7.4° C., 9 days; 9.6° C., 4 days. The pH values of various orange juices range from 3.0 to 4.0. The pH for grapefruit juice is about 3.4. At these pH values, molds and yeast organisms can proliferate.

During the storage of citrus juices, ascorbic acid decomposes, the rate depending on the amount of oxygen, the pH and the storage temperature of the juice. Orange juice (pH 4.06) held for 16 days at 5° C. lost 70% of the original amount of ascorbic acid (Alli and Kermasha, J. Food Sci. 54, 674, 1989).

Fresh citrus juices, tropical fruit juices and citrus-tropical juice blends, fruit juices and fruit juice blends are popular with consumers since they possess ripe fruit quality attributes such as fresh fruit flavour, an appealing colour and turbidity (cloud). The addition of tropical fruit juices such as papaya, mango and pineapple to citrus juices has gained a niche in the marketplace. Blends of citrus juices with up to about 20% tropical fruit juices have pleasant flavour profiles.

The shelf life of fruit juices can be prolonged by heat treatment to inactivate enzymes and microorganisms (J. J. Jen, Quality Factors of Fruits and Vegetables. 1989. American Chemical Society, Washington, D.C.). However, with pasteurization of juices, the fresh fruit flavour changes to a heat-processed flavour. In the case of orange juice, pasteurization brings about the formation of secondary aroma compounds such as oxidation products of limonene and of Maillard reaction products (P. Schrier, In Quality in Stored and Processed Vegetables and Fruit, 1981. Goodenough, P. W. and Atkin, R. K. Eds. Academic Press, New York).

Modified atmosphere packaging (MAP) is a term used to denote the process of gasifying the headspace around a commodity such as a fruit or vegetable in a container prior to hermetically sealing the container. The gas mixture introduced into the headspace is commonly made up of oxygen, carbon dioxide, nitrogen and sometimes noble gases. The composition of the gas mixture is dependent on the type of fruit or vegetable, the cultivar and the required storage time. The container generally has specific gas permeability characteristics, the values being dependent on the rate of respiration of the fruit or vegetable involved and the desired ultimate gas composition. At some point during storage of a fruit or vegetable under MAP, an equilibrium gas mixture in the headspace of the container will evolve whereupon the contents of oxygen, carbon dioxide, nitrogen and other gases in the headspace gas mixture are constant. Under these circumstances, the amount of oxygen utilized per unit time in the respiration of a fruit or vegetable is equal to the amount of oxygen transported through the walls of the container. Further, the amount of carbon dioxide generated per unit time in the fruit respiration is equal to the loss of carbon dioxide per unit time from the headspace by transport through the walls of a container to the outside air.

References relating to modified atmosphere packaging (MAP) of fruit and patents granted for such a technique have conventionally focused on whole, uncut commodities. In general, MAP technology is concerned with the maintenance of a suitable oxygen-containing microatmosphere around whole fruits in oxygen permeable containers. MAP technology for whole fruits requires that aerobic conditions be maintained in the microatmosphere enveloping the whole fruit in order to prevent the development of anaerobic or fermentation "off-flavour" in the fruit. Yet at the same time, the atmosphere must contain a sufficient amount of carbon dioxide to inhibit the rates of fruit respiration, ripening and microbial growth. Certain patents disclose the removal of some of the ethylene and carbon dioxide in the surrounding atmosphere by the inclusion of a packet of chemicals in the container prior to sealing.

In a general sense, the development of modified atmosphere packaging (MAP) of fruit is in its infancy. Studies have focused on the $O_2/CO_2$ gas flushing of packages containing whole strawberries. It has been determined that with such a process, the storage life of the strawberries can be lengthened by up to 8 days. It has also been discovered that when apples are packaged in Cryovac™ bags with a modified atmosphere, the shelf life of the whole apples is extended from one week to four to six weeks (LaBell, Food Processing, January, 152, 1985).

A wide variety of plastic films with different permeabilities to gases are commercially available for the modified atmosphere storage of fruits. Saguy and Mannheim (Cooling and Ripening of Fruits in Relation to Quality, Refrigeration Science and Technology, 149, 1973, Int. Inst. Refrig.) have shown that selected plastic films with various $O_2$ permeabilities can prolong the shelf life of strawberries. Marcellin (Rev. Gen. Froid 64:217, 1974) discusses the use of a polyethylene and a silicone membrane for the modified atmosphere storage of several fruits. It has been noted that $O_2$ transport through the plastic films ensured aerobic respiration of the fruits, yet contributed to the proliferation of aerobic microorganisms such as molds.

The following patents relate directly or indirectly to whole or fruit segment preservation:

| U.S. Pat. No. | Inventor | Issue Date |
| --- | --- | --- |
| 3,111,412 | Mouk | Nov. 19, 1963 |
| 4,001,443 | Anantray | Jan. 4, 1977 |
| 4,006,257 | Kolk | Feb. 1, 1977 |
| 4,055,931 | Myers | Nov. 1, 1977 |
| 4,079,152 | Bedrosian et al. | Mar. 14, 1978 |
| 4,235,750 | Cazalet | Nov. 25, 1980 |
| 4,331,693 | Gozdziewicz et al. | May 25, 1982 |
| 4,337,276 | Nakamura et al. | June 29, 1982 |

-continued

| | Inventor | Issue Date |
| --- | --- | --- |
| 4,411,921 | Woodruff | Oct. 25, 1983 |
| 4,423,080 | Bedrosian et al. | Dec. 27, 1983 |
| 4,515,266 | Myers | May 7, 1985 |
| 4,895,729 | Powrie et al. | Jan 23, 1990 |
| West German Patent Number | | |
| 2,922,145 | Kurz | Mar. 20, 1980 |
| 3,136,622 | Chekalov et al. | May 30, 1984 |
| Austrian Patent Number | | |
| 225,346 | Fetkenheue | Jul. 31, 1985 |

Modified atmosphere packaging technology for the preservation of freshly extracted fruit juices and juice blends has not been reported. Modified atmosphere packaging technology has been applied to fruits and vegetables where the cells remain intact and continue to respire. Modified atmosphere packaging technology also usually employs gases with low to moderate levels of carbon dioxide, or none at all.

SUMMARY OF THE INVENTION

The invention pertains to a process for preserving fresh fruit juice (including juice blends) which comprises sanitizing the outer surface of a fruit, extracting juice from the edible portion of the fruit (at which time the cell walls are broken or disrupted), gasifying the juice with an oxygen-containing, carbon dioxide-containing gas mixture, placing the juice in a high gas-barrier container to a level for retaining a headspace of about 0.1 to 10% of the total liquid volume, hermetically sealing the container and rapidly cooling the juice in the container to about $-1°$ C. to $4°$ C. Alternatively, the gasified juice may be cooled rapidly to about $-1°$ C. to about $4°$ C. prior to packaging in containers. Alternatively, the juice may be cooled to about $-1°$ C. to about $4°$ C. prior to gasification. Alternatively, gasification of a juice or juice blend may take place when the product is in the container.

The fruit juice can be a citrus fruit juice, a tropical fruit juice, or any other fruit juice, or a combination thereof and the headspace volume can be about 0.1% to 10% of the total liquid volume. Preferably, the headspace volume can be about 0.1% to 5% of the total liquid volume.

The invention also pertains to a process for preserving fresh fruit juice (including juice blends) which comprises: (a) introducing an oxygen-containing, carbon dioxide-containing gas mixture into the juice by bubble-streaming to bring about a specific dissolved concentration in the juice for each of the gases; (b) packaging the gas-treated juice in a high gas-barrier container to prevent air entry into the container and outflow of gas within the container; and (c) rapidly cooling the juice in the container for cold shocking of the juice.

Alternatively, the gasified juice may be cooled rapidly to about $-1°$ to about $4°$ C. prior to packaging in containers. Alternatively, the juice may be cooled to about $-1°$ C. to about $4°$ C. prior to gasification. Alternatively, gasification of a juice or juice blend may take place when the product is in the container.

The invention is also directed to a process for preserving juice obtained from fresh fruit which comprises: (a) sanitizing the outer surface of a fruit from which the fruit is to be derived; (b) extracting juice from the edible portion of the fruit, at which time all of the cells are broken or disrupted; (c) gasifying the juice with an oxygen-containing, carbon dioxide-containing gas mixture to bring about a specific dissolved gas concentration in the juice for each of the gases; (d) filling a container with the juice so that a headspace volume of about 0.1% to about 10% of total liquid volume exists in the container; and (e) cold shocking the juice in the container by rapidly cooling the container and juice to a temperature of about $-1°$ C. to $4°$ C. Alternatively, the gasified juice may be cooled rapidly to about $-1°$ to about $4°$ C. prior to packaging in containers. Alternatively, the juice may be cooled to about $-1°$ to about $4°$ C. prior to gasification.

The headspace volume can preferably be about 0.1% to 5% of the total juice volume and the fruit can be sanitized with a sanitizing agent, which can be selected from the group consisting of chlorine, hydrogen peroxide, or another type of oxidizing agent or from another group of sanitizing agents. The sanitizing agent can be chlorine in water.

The invention relates to a process for preserving fresh fruit juice which comprises: (a) sanitizing the outer surface of a fruit from which juice is to be extracted with a sanitizing agent to inactivate spoilage organisms; (b) extracting juice from the edible portion of the fruit; (c) gasifying the juice at about $-1°$ C. to $30°$ C. by bubble-streaming an oxygen-containing, carbon dioxide-containing gas mixture through the juice; (d) filling a high gas-barrier container with the juice to a level to attain a headspace volume, preferably of about 0.1 to 5% of the total juice volume; (e) hermetically sealing the container; and (f) rapidly cooling the juice in a container to a temperature between about $-1°$ C. and $4°$ C. with a minimum hold time of about 6 to 24 hours.

The gas mixture can consist of about 1% to 20% oxygen and about 5% to 90% carbon dioxide, and an inert gas. The inert gas can be selected from the group consisting of nitrogen, argon, helium and/or other inert gases.

The juice (either a fruit juice or juice blend) can be gasified by bubble-streaming. The juice can be gasified at a temperature of about $-1°$ C. to $30°$ C., preferably about $1°$ C. to about $6°$ C. The gas mixture can be introduced into the juice in the form of small bubbles from a jet or plurality of orifices in a gas dispersion unit or a submerged rotating impeller with a gas blanket above the juice surface. The gas dispersion unit can be constructed of inter-connected perforated pipes or sintered metal plates or sintered glass plates. The gas bubbles in the gasified juice may be further size-reduced and uniformly dispersed by mechanical means such as a rotating impeller, a baffle system, an orifice shear system, or a high frequency vibrating probe inserted into the juice.

The specific levels of dissolved oxygen and carbon dioxide after gasification of the juice and juice blends should be about 2 ppm to 9 ppm, and 100 ppm to 1500 ppm, respectively.

The container must be composed of a material which has high gas-barrier properties so that internal gases are not transported significantly through the walls of the container to the atmosphere and atmospheric air is not transported significantly through the walls of the container to the interior of the container. The container can be constructed of a flexible, semi-flexible or rigid material. The container can be composed of plastic, metal, paperboard-plastic composite or glass, in the form of a bag or bottle or can. The container can be made from, among other things, a polypropylene/ethylene vinyl alcohol/polyethylene combination, or polyethylene terephthalate, or polyvinyl chloride. The maximum gas permeabilities for a container on the basis of cc/100 in.$^2$/24 hr./1 atmosphere at 25° C. should be about 2 for oxygen and about 8 for carbon dioxide.

The juice can be selected from the group consisting of a horticultural fruit juice, a citrus juice, a tropical fruit juice, a citrus-tropical fruit blend, or any juice blend, and the juice can be stored at a temperature between about –1° C. to 8° C., preferably between about –1° C. to about 4° C. The fruit can be sanitized with chlorinated water.

The juice may contain only broken or disrupted fruit cells. The juice can be placed into the container before it is gasified.

In the process according to the invention, the fruit juice can be a blend of fruit juices. Gasification by bubble-streaming or by any other gas solubilizing technique can be conducted in a tank, a flow-through pipe or a container. The gas bubbles can be reduced in size and dispersed uniformly by mechanical means.

The invention is also directed to a process for preserving fresh fruit juice extracted from ripe fruit comprising sanitizing the outer surface of a ripe fruit, extracting juice from the edible portion of the ripe fruit, gasifying the juice at a temperature between about –1° C. to about 30° C. with a gas mixture comprising about 1% to about 20% vol oxygen and about 5% to about 90% vol carbon dioxide, placing the juice in a container, hermetically sealing the container and rapidly cooling the juice in the container.

BRIEF DESCRIPTION OF THE DRAWING

In drawings which disclose specific embodiments of the invention and are not intended to restrict the spirit or scope of the invention in any way:

FIG. 1 illustrates a graph of sensory evaluation results of grapefruit juice stored for 71 days according to the invention.

DETAILED DESCRIPTION OF SPECIFIC EMBODIMENTS OF THE INVENTION

This invention pertains to a process system for preserving fresh citrus juices, tropical fruit juices, citrus-tropical fruit juice blends, and any other fruit juices, or any blend of fruit juices, which have been extracted from ripe, sanitized fruits, for storage periods up to about 12 weeks at refrigerated temperatures of about – 1° C. to 8° C. without appreciable loss of fresh natural flavour, colour and texture. The process involves the sanitizing of the outer surface of a fruit, extracting the juice from the edible portion of the fruit, at which time all of the cells are broken or ruptured, gasifying the juice or juice blend with an oxygen-containing, carbon dioxide-containing gas mixture by bubble-streaming, and optionally, further dispersing and size-reducing the gas bubbles by mechanical means, filling the juice or juice blend into a high gas-barrier container to a level for attaining a headspace of about 0.1% to 10% and preferably about 0.1% to 5% of the total liquid volume, hermetically sealing the container and rapidly cooling the juice or juice blend in a container to about –1° C. to 4° C. for cold shocking of the juice, and subsequent storage at about –1° C. to about 8° C., preferably between about –1° C. to about 4° C.

The steps in the process include: (a) the sanitizing of the outer surface of a fruit by a sanitizing agent in water applied to the fruit by immersion, spraying or other mechanical means; (b) extracting the juice from the edible portion of the fruit; (c) gasifying the juice at about –1° C. to 30° C. by bubble-streaming an oxygen-containing, carbon dioxide-containing gas mixture through the juice and optionally, further dispersing and size-reducing the gas bubbles by mechanical means, to bring about specific dissolved oxygen and carbon dioxide levels in the juice of 2 ppm to 9 ppm, and 100 ppm to 1500 ppm, respectively; (d) filling a high gas barrier container with the juice so that a headspace volume of about 0.1 to 10% of the total juice volume exists; and (e) cold shocking the juice in a container by rapid cooling to temperatures of –1° C. to 4° C. Since the juice or juice blend must have low mold, yeast and bacterial counts as input fluids, sanitizing the outer surfaces of the fruit with a sanitizing agent such as chlorine in water (about pH 6) prior to juice extraction is an important step in the process system. This process system involves modified atmosphere packaging technology with the introduction of a gas mixture consisting of oxygen and carbon dioxide into a juice or juice blend packaged in a high gas-barrier container.

The processing system in one aspect includes: (a) sanitizing the outer surface of the fruit with a sanitizing agent such as chlorinated water to inactivate spoilage organisms; (b) extracting the juice from the edible portion of the fruit, at which time all of the cells are broken or disrupted, and adding other juices to form a blend; (c) gasifying the juice or juice blend at about –1° C. to 30° C. by bubble-streaming an oxygen-containing, carbon dioxide-containing gas mixture through the liquid and optionally further dispersing and size-reducing the gas bubbles by mechanical means; (d) filling the container with the juice or juice blend to a level for attaining a headspace volume, preferably of about 0.1 to 5% of the total liquid volume; (e) hermetically sealing the container; and (f) rapidly cooling the juice or juice blend in a container to a temperature between about –1° C. and 4° C. with a minimum hold time of about 6 to 24 hours.

In the gasification step of the process, the gas mixture to be used in bubble-streaming should preferably consist of 1 to 20% vol oxygen and 5 to 90% vol carbon dioxide and with the addition of inert gases such as nitrogen, helium and/or argon being the inert gases. Bubble-streaming of the gas mixture involves the introduction of a stream or streams of very small bubbles into the juice or juice blend from one or more orifices in a gas dispersion unit such as a jet, jets, interconnected perforated pipes, sintered metal plates or sintered glass plates or from a submerged rotating impeller with a gas blanket above the juice surface. Bubble-streaming of the gas mixture optimizes the gasification step by broad exposure of the juice or juice blend to numerous small gas bubbles, and speeds up the process of bringing about gas solubilization to a specific dissolved gas concentration in the juice or juice blend for each of the gases. Bubble-streaming may occur in juice within a tank or in juice moving in a pipe or in juice within a container.

The container should be composed of a material which has high gas-barrier properties so that the internal gases do not pass significantly through the container walls to the atmospheric air and atmospheric air is not transported significantly through the wall to the interior of the container. The container may be flexible, semi-flexible or rigid, plastic, metal, paperboard-plastic composite and/or glass, and may be in any form such as a bag, or bottle or can. The containers should have maximum gas permeabilities on the basis of cc/100 in.$^2$/24 hr./1 atmosphere at 25° C. of about 2 for oxygen and about 8 for carbon dioxide.

Fresh citrus juices, tropical fruit juices, citrus-tropical fruit juices, and other fruit juices and juice blends contain disrupted and broken cells. Juices contain compartmentalized active enzymes in the form of organelles such as mitochondria, endoplasmic reticulum, ribosomes and lysosomes. The serums of the juices and juice blends contain cytoplasmic respiratory enzymes which are capable of breaking down sugars to pyruvic acid. Pyruvic acid can be broken down in the mitochondria, in the presence of oxygen, to carbon dioxide and water by respiratory enzymes. In the aerobic respiration of a fruit, sugars and acids are degraded enzymatically in the respiration process to carbon dioxide and water. As well, adenosine triphosphate (ATP), a high energy biocompound, is formed in the aerobic respiration pathway. ATP is essential for the maintenance of the structures of organelle membranes, aerobic respiration process and the synthesis of pigments and flavour compounds.

If oxygen is lacking in the fresh juice blends, then anaerobic respiration may proceed. In the anaerobic respiration pathway, pyruvic acid is decomposed to off-flavour compounds such as ethanol, lactic acid and acetaldehyde. Further, only small amounts of ATP are formed and thus membrane structures may decompose with possible quality deterioration of the juice during storage.

The inventors have determined that to preserve the flavour, colour and texture of fresh citrus juices, tropical fruit juices, citrus-tropical fruit juice blends, and other fruit juices or fruit juice blends, degradative enzyme activities must be impeded, yet an aerobic environment must be maintained to prevent anaerobic off-flavour development.

The inventors have also discovered that aerobic respiration occurs in fruit juices at a very low rate with the consumption of oxygen dissolved in the juice and the production of carbon dioxide. Previous studies on whole fruits and vegetables (C. G. Wang, In Food Preservation by Modified Atmospheres. 1990. Calderon, M. and Barkai-Golan, R. Eds. CRC Press, Boca Raton, Fla.) have shown that carbon dioxide in the microatmosphere around fresh whole commodities can reduce the respiration rate, ethylene production and the rate of ripening.

The retention of ascorbic acid in citrus juices and citrus-tropical fruit juice blends is important since these juices are excellent sources of vitamin C. The inventors have further determined that the oxidation of ascorbic acid can be impeded by dissolving carbon dioxide in the juice through (a) the carbon dioxide mass action effect in the oxidation reaction with the displacement of oxygen from the ascorbic acid molecule, and (b) carbon dioxide adsorption on the active site of ascorbic acid oxidase and other oxidases involved in the oxidative decomposition of ascorbic acid.

Inhibition of microbial growth in fresh citrus juices, tropical fruit juices, citrus-tropical fruit juices, and any other fruit juice, or fruit juice blends, is essential for prolonging the shelf life of the products. Day, Skura and Powrie (Can. Inst. Food Sci. Technol. J. 23, 59, 1990) found that low oxygen and high carbon dioxide contents in the microatmosphere of a container can inhibit the growth of bacteria, yeasts and molds on whole blueberries. In the inventors' studies on the microbial counts for gasified (MAP) and ungasified orange juices after 4 weeks of storage at 2° C., the results showed that the standard plate count and the yeast and mold counts for gasified (MAP) orange juice were markedly lower than those for ungasified orange juice, as shown in Table 1.

It has been found for the purpose of our invention that the level of ripeness of each whole fruit is an important factor in the successful preservation of the freshly extracted fruit juice, or juice blend, by the modified atmosphere packaging (MAP) of the invention. Fruit for extraction into juice or juice blends should be ripened to an eating quality level. Such ripe fruit will have a characteristic fresh flavour and an optimum colouration. The fruit should be free of pre-harvest diseases, bruising and post-harvest microbial decomposition.

Juices should be extracted from edible portions of ripe fruits by reaming, masceration, pressing or other means. The cell walls must be ruptured during extraction to free the vacuolar solution and organelles. The amount of broken cell wall residue (pulp) will have an influence on the consistency of the extracted juice, but should not be a critical factor in the success of the preservation process. The presence of the organelles in the extracted juice is considered to be complementary to the influence of the input carbon dioxide. A certain degree of pulp may be removed from extracted juices by screen or sedimentation separation operations.

It has been determined that the pH of fruit juices and juice blends to be packaged under modified atmosphere (MAP) should be below 4.5 to ensure safety and effective preservation of the freshness for extended storage times.

Gasification of the juices and juice blends by bubble-streaming or by any other gas solubilizing technique followed optionally by mechanical dispersing and size-reduction of the gas bubbles, is required to create functional gas solutions of carbon dioxide and oxygen. Inert gases such as nitrogen, argon and helium may be considered. The carbon dioxide in solution is functional as an antimicrobial agent, and as an inhibitor of ethylene production, ripening and respiration. It is well known that excessive levels of carbon dioxide in intact fruit tissue can cause injury to the membranes and bring about quality deterioration to the fruit. However, when the cells of citrus and tropical fruits and other fruits are ruptured during the extraction process, the resulting juices can tolerate higher levels of carbon dioxide in solution than intact fruit tissue. The dissolved carbon dioxide level in juice after gasification should be about 100 ppm to 1500 ppm. Oxygen in the juices and juice blends is a functional gas for maintaining limited aerobic enzymic reactions to prevent off-flavour development, to stabilize membranes of the organelles and to encourage synthesis of desirable flavours and pigments. The dissolved oxygen level in the juice after gasification should be about 2 ppm to 9 ppm.

The levels of 1 to 20% vol oxygen and 5 to 90% vol carbon dioxide in the gas mixture are required for gasification to preserve the juices and juice blends for periods up to about 12 weeks. The levels of 2 to 12% vol oxygen and 30 to 70% vol carbon dioxide in the gas mixture are preferred. For effective inhibition of microbial growth, respiration and ripening, and for maintaining a limited aerobic environment, the specific levels of dissolved $O_2$ and $CO_2$ after gasification of juice and juice blends should be about 2 ppm to 9 ppm, and 100 ppm to 1500 ppm, respectively.

Prior to gasification, the temperatures of the juices and juice blends should be in the range of about −1° C. to 30° C., with a preferred temperature range of about 0° C. to 6° C. for effective solubilization of the gases. Normally, the temperature of the gasified juices and juice blends in sealed containers should be about −1° C. to 8° C., preferably at about −1° C. to about 4° C., during storage, transport and retailing for prolonging the shelf life.

We have discovered that the containers, after being filled with extracted, gasified fruit juice or juice blend and being sealed, or closed, should be placed in a refrigerated room or bath with temperatures of about −1° C. to 4° C. Alternatively, the gasified fruit juice or juice blend may be cooled rapidly to about −1° C. to 4° C. in a heat exchanger prior to packaging into containers. Alternatively, the juice or juice blend may be cooled to −1° C. to 4° C. prior to gasification and packaging. This temperature drop and holding time of about 6 to 24 hours appears to prompt the enhancement of defence mechanisms against juice or juice blend deterioration. These lower outer temperatures are also beneficial to increase water solubility of oxygen in the fruit juice or juice blend. The large amount of carbon dioxide in the juice or juice blend will thereby effectively inhibit enzyme deteriorating reactions and inhibit deteriorating microbial growth. Further, the low temperature of the fruit juice reduces enzymic reaction rates, and inhibits microbial growth.

Advantageously, the containers may be constructed of a non-flexible, semi-flexible or flexible material which may possess sufficient structural rigidity to enable a slight positive gas pressure to be maintained in the containers. Containers constructed of (1) a composite of polypropylene/ethylene vinyl alcohol/polyethylene or (2) polyethylene terephthalate or polyvinyl chloride are suitable.

The following discussion, examples and tabulated data explain and illustrate certain specific conditions which have been used according to the invention for the successful preservation of freshly extracted fruit juice and juice blends for prolonged periods of time. Some freshly extracted fruit juices and juice blends which we have preserved successfully by the modified atmosphere packaging process of this invention include: orange juice, grapefruit juice, pineapple juice and blends of orange and mango juices and orange and pineapple juices, and apple juice and grape juice, and raspberry juice.

EXAMPLE 1

Freshly prepared orange juice was extracted inhouse from Valencia oranges, and packaged under modified atmosphere packaging (MAP), as outlined above and below, then cooled rapidly at 2° C. and then stored at 2° C. The quality of the gasified stored juice was compared with freshly extracted juice, by both chemical and sensory analysis for a storage period of 8 weeks.

Before juice extraction, the whole oranges were washed in 150 ppm available chlorine solution to reduce the surface microbial population of the fruit. After extraction, the juice was immediately dispensed into pouches made from a high gas-barrier plastic film and the juice at about 5° C. was then bubble-streamed with a gas mixture having a composition of 10% oxygen, 60% carbon dioxide, 5% argon and 25% nitrogen, before the pouches were sealed. The specific levels of dissolved $O_2$ and $CO_2$ in the gasified juice were about 6 ppm and 300 ppm, respectively. This gasification procedure is the alternative method (as mentioned previously) to gasification of juice and juice blends in a tank or flow through pipe prior to filling into containers. The juice in the pouches was rapidly cooled to 2° C. and stored at about 2° C. for periods up to 8 weeks.

Chemical analyses on the juices included determination of percent soluble solids, percent titratable acidity, pH, and ascorbic acid content. From a nutritional standpoint, ascorbic acid (vitamin C) retention is of paramount importance since ascorbic acid is destroyed rapidly under aerobic conditions.

Analysis of orange juice samples was performed in accordance with procedures outlined in the "Official Methods of Analysis of the Association of Official Analytical Chemists", Fifteenth Edition, 1990.

TABLE 1

Microbial Counts for Gasified (MAP) and Non-Gasified (Non-MAP) Orange Juices Stored at 2° C. for 8 Weeks

|  | Gasified | Non-gasified |
| --- | --- | --- |
| Standard Plate Count (CFU/mL) | 15,000 | 150,000 |
| Yeast (CFU/mL) | 20 | 86,000 |
| Mold (CFU/mL) | 130 | 3,600 |

For sensory analysis of the juices, sensory evaluation sessions were held every other week during storage. The stored modified atmosphere packaged (MAP) juice and the freshly extracted juice as a standard were compared by panelists for sensory evaluation. The sensory attributes evaluated were: (1) visual appeal; and (2) flavour. Attributes included in the visual appeal were colour and cloudiness. The flavour attributes included: sweet/sour balance, fruit flavour, off-flavour, and body. For the sensory attributes, a score of 10 means highly acceptable and a score of 1 means highly unacceptable. For off-flavour, 10 means absolutely no off-flavour, and 1 means very strong off-flavour. A score of 5 was the cut-off point between acceptability and unacceptability.

Results

Visual appeal and body of MAP orange juice did not change over the entire storage period, as compared to the freshly extracted orange juice standard. The sensory evaluation results of orange flavour and off-flavour during the storage period are presented in Table 2. The results indicated that MAP orange juice remained highly acceptable throughout the 8-week storage time, with scores of 9 or greater. No carbonate taste was evident.

Regarding chemical analysis, the results showed that percentage titratable acidity (% TA) values of the MAP orange juice remained relatively constant throughout the storage period. Soluble solids (% SS) values for the juices decreased very slowly with time. After 8 weeks of storage, the soluble solids value decreased from about 10% to 9.5%.

TABLE 2

Sensory Evaluation Results for Stored Gasified MAP and Freshly Extracted Orange Juices a. ORANGE FLAVOUR

|  | Score | |
| --- | --- | --- |
| Storage Time (Weeks) | MAP Juice | Freshly Extracted[1] Orange Juice |
| 0 | 10.0 | 10.0 |
| 2 | 9.9 | 10.0 |
| 4 | 9.9 | 10.0 |
| 6 | 9.6 | 10.0 |
| 8 | 9.4 | 10.0 |

[1]Freshly extracted from oranges on the day that the stored MAP juice was tested.

b. ABSENCE OF OFF-FLAVOUR

|  | Score | |
| --- | --- | --- |
| Storage Time (Weeks) | MAP Juice | Freshly Extracted Orange Juice |
| 0 | 10 | 10 |
| 2 | 10 | 10 |
| 4 | 10 | 10 |

TABLE 2-continued

| | | |
|---|---|---|
| 6 | 10 | 10 |
| 8 | 10 | 10 |

Ascorbic acid contents of the stored MAP juice are presented in Table 3. The results indicate that the ascorbic acid content of stored MAP juice remained relatively constant during the entire 8-week storage period.

TABLE 3

Ascorbic Acid Content of Stored MAP Orange Juice

| | Ascorbic Acid Content (mg per 100 mL) Storage Time (Weeks) | | | | |
|---|---|---|---|---|---|
| Juice Sample | 0 | 1 | 4 | 6 | 8 |
| MAP Orange Juice | 38.3 | 39.8 | 39.2 | 38.6 | 40.0 |

EXAMPLE 2

Orange Juice Blends

Before juice extraction, whole oranges, mangoes and pineapples were washed in 300 ppm chlorine solution for 3 to 5 minutes to reduce the microbial population on the fruit surface. After extraction, the juices were mixed immediately as follows:

1. Orange juice and pineapple juice were blended together in the volume ratio of 80 to 20, respectively.
2. Mango juice and orange juice were blended together in a volume ratio of 10 to 90, respectively.

The juice blends at about 5° C. were gasified by bubble-streaming of a gas mixture composed of: 8% oxygen, 70% carbon dioxide, 3% argon, and the balance nitrogen, for 20 to 30 seconds. The final dissolved $O_2$ and $CO_2$ levels were 7 ppm and 450 ppm, respectively. The juice blends were then filled into pouches made from plastic film with high gas-barrier properties and the pouches were hermetically sealed. The sealed pouches were then cooled immediately to 2° and stored at about 2° C. for periods up to 8 weeks.

For sensory analysis of the juice blends, sensory evaluation sessions were held at one week intervals. The sensory attributes evaluated included visual appeal, sweet/sour balance, flavour, body, off-flavour and overall acceptability. The results are presented in Tables 4 and 5.

The sensory attributes of the MAP mango-orange juice and pineapple-orange juice blends did not change appreciably over the entire 8-week storage period. There was no significant development of off-flavour, and there was only a slight decrease in flavour acceptability.

For both the gasified (MAP) 10% mango juice in the orange juice blend and the gasified (MAP) 20% pineapple juice in the orange juice blend, no appreciable colour change, loss of flavour, or off-flavour development over the 8-week storage period was evident. No carbonate taste was detected.

Chemical analyses on the juice blends included the determination of percent soluble solids, percent titratable acidity, pH, and ascorbic acid. Over the 8-week storage period, the values of percent soluble solids, percent titratable acidity, and pH did not change appreciably. The ascorbic acid content of the juice blends during storage remained relatively constant (about 40 mg per 100 mL).

TABLE 4

Summary of Sensory Evaluation Results for Mango-Orange Juice Blend

| | Storage Time (Weeks) | | | | |
|---|---|---|---|---|---|
| Attribute | 0 | 1 | 4 | 6 | 8 |
| A. 10% MANGO JUICE IN ORANGE JUICE BLEND (REPLICATE #1) | | | | | |
| Visual Appeal | exc (excellent) | exc/good | exc/good | good | good/exc |
| Sweet/Sour Balance | exc | exc/sweet | good/sl. sweet | good/sl. sweet | good/sl. sweet |
| Flavour | exc | good | good | good | good |
| Body | acceptable | acceptable | acceptable | acceptable | acceptable |
| Off-Odour | none | none | none | none | none |
| Overall Acceptability | acceptable | acceptable | acceptable | acceptable | acceptable |
| 10% MANGO JUICE IN ORANGE JUICE BLEND (REPLICATE #2) | | | | | |
| Visual Appeal | exc (excellent) | exc/good | exc/good | exc | good/exc |
| Sweet/Sour Balance | exc | good/sl. sweet | good/sl. sweet | good/sl. sweet | good/sl. sweet |
| Flavour | good | exc/good | good | fair | good |
| Body | acceptable | acceptable | acceptable | acceptable | acceptable |
| Off-Odour | none | none | none | none | none |
| Overall Acceptability | acceptable | acceptable | acceptable | acceptable | acceptable |

TABLE 5

Summary of Sensory Evaluation Results for Pineapple-Orange Juice Blend

| | Storage Time (Weeks) | | | | |
|---|---|---|---|---|---|
| Attribute | 0 | 1 | 4 | 6 | 8 |
| A. 20% PINEAPPLE JUICE IN ORANGE JUICE BLEND (REPLICATE #1) | | | | | |
| Visual Appeal | exc (excellent) | exc/good | good | good | good |
| Sweet/Sour Balance | exc | exc/sl. sour | good/sl. sweet | good/sl. sour | good/sl. sour |
| Flavour | exc/good | exc/good | exc | good | good |
| Body | acceptable | acceptable | acceptable | acceptable | acceptable |
| Off-Odour | none | none | none | none | none |
| Overall Acceptability | acceptable | acceptable | acceptable | acceptable | acceptable |
| B. 20% PINEAPPLE JUICE IN ORANGE JUICE BLEND (REPLICATE #2) | | | | | |
| Visual Appeal | exc (excellent) | good | good | good | good |
| Sweet/Sour Balance | exc/good | good/sl. sour | good/sl. sweet | good | good/sl. sour |
| Flavour | exc | good | exc/good | good | good |
| Body | acceptable | acceptable | acceptable | acceptable | acceptable |
| Off-Odour | none | none | none | none | none |
| Overall Acceptability | acceptable | acceptable | acceptable | acceptable | acceptable |

EXAMPLE 3

Grapefruit Juice

Fresh grapefruit juice was extracted from sanitized California grapefruit using the same method as described in the previous examples. A mixture of 13% oxygen, 55% carbon dioxide, 5% argon and 27% nitrogen was bubble-streamed into the juice at about 5° C. The final dissolved $O_2$ and $CO_2$ concentration levels were 6.5 ppm and 380 ppm, respectively. The juice was bottled in high gas-barrier plastic bottles, sealed air tight, and then cooled to 2° C. and stored at about 2° C.

Sensory analysis was carried out at approximately one week intervals. The attributes included visual appeal, sweet/sour balance, flavour body and absence of off-flavour. A summary of sensory evaluation results is shown in FIG. 1. From FIG. 1, it can be seen that after 10 weeks (71 days) of storage, the grapefruit juice maintained its top-level fresh quality.

EXAMPLE 4

Grapefruit Juice Blends

Fresh grapefruit juice, orange juice and pineapple juice were extracted according to the previously described procedures and two kinds of grapefruit juice blends were prepared:
1. Grapefruit juice-orange juice (50:50);
2. Grapefruit juice-pineapple juice (80:20).

Gasification of the juice at about 5° C. was carried out using a gas mixture of 5% oxygen and 65% carbon dioxide, balanced with nitrogen, with final dissolved $O_2$ and $CO_2$ levels at 6.5 ppm and 350 ppm, respectively. The juice blends were then introduced into high gas-barrier containers and sealed air tight. The juice in the containers was cooled to 2° C. and stored at about 2° C.

Sensory evaluation was carried out after the juices had been stored for 8 weeks. The results are shown in Table 6. The stored juice blends were considered by panelists to be very acceptable.

TABLE 6

Sensory Evaluation of Grapefruit-Orange and Grapefruit-Pineapple Juice Blends Stored for 8 Weeks at 2° C.

| | Grapefruit Juice-Orange Juice | Grapefruit Juice-Pineapple Juice |
|---|---|---|
| Visual Appeal | Excellent/good | Good |
| Sweet/sour balance | Excellent | Excellent |
| Flavour | Excellent/good | Excellent/good |
| Body | Acceptable | Acceptable |
| Off-flavour | None | None |
| Overall Acceptability | Very acceptable | very acceptable/acceptable |

EXAMPLE 5

Apple Juice

Fresh apple juice was extracted from Macintosh apples washed in 100 ppm $Cl_2$ solution for about 5 minutes. Ascorbic acid was added immediately to the juice at a level of 75 mg per liter as a supplemental nutrient. The juice at about 5° C. was gasified with a gas mixture of 2% $O_2$, 80% $CO_2$ and the balance as $N_2$ until the dissolved $O_2$ and $CO_2$ levels reached 5 and 700 ppm, respectively. The juice was packaged in high gas-barrier containers and hermetically sealed. The juice in the containers was cooled to 2° C. and stored at about 2° C.

Sensory evaluation of the juice was carried out weekly for an 8-week period. The sensory evaluation results are presented in Table 7. For quality attributes, a score of 10 means highly acceptable and a score of 1 means highly unacceptable. A score of 5 was designated as the cut-off point between acceptability and unacceptability. After 8 weeks of storage, the apple juice was scored as 8 and 9 for the sensory attributes and did not possess an off-flavour.

TABLE 7

Summary of Sensory Evaluation Results for Apple Juice

| Storage Time (Weeks) | Visual Appeal | Sweet/ Sour Balance | Apple Flavor | Body | Off-Flavor | Overall Acceptability |
|---|---|---|---|---|---|---|
| 1 | 8 | 9 | 9 | 9 | None | 9 |
| 2 | 8 | 9 | 8 | 9 | None | 9 |
| 3 | 8 | 8 | 9 | 9 | None | 9 |
| 4 | 8 | 9 | 8 | 9 | None | 9 |
| 5 | 8 | 9 | 9 | 9 | None | 9 |
| 6 | 8 | 8 | 8 | 9 | None | 8 |
| 7 | 8 | 9 | 9 | 9 | None | 9 |
| 8 | 8 | 8 | 9 | 9 | None | 9 |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for preserving fresh fruit juice extracted from ripe fresh fruit comprising extracting unheated fresh juice from the edible portion of the ripe fresh fruit, and immediately thereafter gasifying the unheated fresh juice at a temperature between about −1° C. to about 30° C. by introducing a gas mixture comprising about 1% to about 20% vol oxygen and about 5% to about 90% vol carbon dioxide into said fresh juice, such that after said introduction step the dissolved oxygen concentration level in the unheated fresh juice is between about 2 to 9 ppm and the dissolved carbon dioxide concentration level in the unheated fresh juice is between about 100 and about 1500 ppm and wherein the concentration of oxygen in the unheated fresh juice is sufficient to enable limited aerobic enzymatic reactions to occur in the unheated fresh juice and to prevent anaerobic off-flavour development and the concentration of carbon dioxide in the unheated fresh juice is sufficient to inhibit microbial growth, respiration, senescence and oxidation of ascorbic acid in the unheated fresh juice, and thereafter directly placing the unheated gasified fresh juice in a high gas-barrier container, sealing the container and rapidly cooling the unheated fresh juice in the sealed container.

2. A process according to claim 1 wherein the juice is placed in the container so that there is a headspace volume of about 0.1% to 10%.

3. A process according to claim 1 wherein the container is hermetically sealed and the juice is cooled to about −1° C. to 4° C. after hermetically sealing the container.

4. A process according to claim 1 wherein the oxygen-containing, carbon dioxide-containing gas mixture is introduced into the juice by bubble-streaming to bring about the specific levels of dissolved oxygen and carbon dioxide in the unheated fresh juice; the gasified, unheated fresh juice is packaged in a high gas-barrier container sufficient to prevent air entry into the container and outflow of gas within the container; and the unheated fresh juice in the container is rapidly cooled sufficiently to cold shock the unheated fresh juice.

5. A process according to claim 1 wherein the outer surface of the fresh fruit is sanitized with a sanitizing agent before extracting the unheated fresh juice.

6. A process according to claim 5 wherein the sanitizing agent is selected from the group consisting of chlorine and hydrogen peroxide.

7. A process according to claim 6 wherein the sanitizing agent is chlorine.

8. A process according to claim 1 wherein the unheated fresh juice is gasified by bubble-streaming.

9. A process according to claim 1 wherein the juice is rapidly cooled in the container to a temperature between about −1° C. and 4° C. with a minimum hold time of about 6 to 24 hours.

10. A process according to claim 1 wherein the gas mixture consists of about 1 to 20% vol oxygen, about 5 to 90% vol carbon dioxide, and the remainder being an inert gas other than carbon dioxide.

11. A process according to claim 10 wherein the inert gas is selected from the group consisting of nitrogen, argon, and helium.

12. A process according to claim 1 wherein the gas mixture is introduced into the unheated fresh juice in the form of small bubbles from a jet or a plurality of orifices in a gas dispersion unit or a submerged rotating impeller with a gas blanket above a surface of the unheated fresh juice.

13. A process according to claim 12 wherein the gas dispersion unit is constituted by a member selected from the group consisting of a jet, interconnected perforated pipes, sintered metal plates and sintered glass plates.

14. A process according to claim 1 wherein the container is composed of a material which has high gas-barrier properties such that internal gases are not transported significantly through the walls of the container to the atmosphere and atmospheric air is not transported significantly through the walls of the container to the interior of the container.

15. A process according to claim 14 wherein the container is constructed of a flexible, or semi-flexible or rigid material.

16. A process according to claim 1 wherein the juice is a blend of fresh fruit juices.

17. A process according to claim 1 wherein the oxygen in the gas mixture is between about 2 to 12% vol and the carbon dioxide is between about 30 and 70% vol.

* * * * *